United States Patent [19]
Lindgren

[11] Patent Number: 5,228,229
[45] Date of Patent: Jul. 20, 1993

[54] PLANT GROWING AND CULTIVATION SYSTEM

[76] Inventor: Mats Lindgren, Såggatan 55b, S-414 67 Göteborg, Sweden

[21] Appl. No.: 761,342

[22] PCT Filed: Mar. 15, 1990

[86] PCT No.: PCT/SE90/00163
§ 371 Date: Sep. 6, 1991
§ 102(e) Date: Sep. 6, 1991

[87] PCT Pub. No.: WO90/11680
PCT Pub. Date: Oct. 18, 1990

[30] Foreign Application Priority Data
Apr. 6, 1989 [SE] Sweden ............... 8901212

[51] Int. Cl.⁵ .............................. A47G 7/00
[52] U.S. Cl. ............................. 47/39; 47/60; 108/24; 108/26
[58] Field of Search ............ 47/17, 18, 39; 108/24, 108/26, 150

[56] References Cited
U.S. PATENT DOCUMENTS

| | | | |
|---|---|---|---|
| 1,930,742 | 10/1933 | De Saussure | 108/150 |
| 1,939,015 | 12/1933 | McLellan | 47/17 MS |
| 3,024,569 | 3/1962 | Nearing | 47/18 R |
| 3,828,695 | 8/1974 | Skarky | 108/26 |

FOREIGN PATENT DOCUMENTS

| | | | |
|---|---|---|---|
| 2812324 | 9/1979 | Fed. Rep. of Germany | 47/18 |
| 94980 | 9/1959 | Norway | 47/18 |

*Primary Examiner*—Henry E. Raduazo
*Attorney, Agent, or Firm*—Griffin, Butler, Whisenhunt & Kurtossy

[57] ABSTRACT

The present invention relates to a plant growing and cultivation system, comprising a plant growing table (1), plant growing containers (8) mounted in said table as well as a drainage system for surplus water and condensing water from said plant containers. The table is built with profiles (4,5), connected to each other and forming bearing supports (15,21) for soil-carrying plates or plant containers mounted in the table, which bearing supports include elements, which form channels (16,22).

8 Claims, 8 Drawing Sheets

PLANT GROWING AND CULTIVATION SYSTEM

The present invention relates to a system for growing and cultivating plants, comprising a plant table, plant boxes arranged in the table as well as a drainage system for surplus water and condensing water from the plant boxes.

BACKGROUND OF THE INVENTION

In many situations it is not possible or not suitable to grow plants at ground level. Many older and disabled people, and particularly those bound to their wheelchair, are not able to manage a planting efficiently at ground level.

When plants are cultivated and grown indoors to be planted outdoors later on, various types of boxes and the like are used, which are placed on tables, benches or the like. Frequent problems with the watering, the run-off of surplus water as well as the soil cultivation occur.

In, e.g., public buildings it is often difficult and expensive to make alterations in a flower or plant arrangement with flower boxes.

The object of the present invention is to suggest a plant growing system of the type mentioned above, which is versatile and allows growing indoors as well as outdoors, and which allows working in a sitting position at the table e.g. in a wheel chair and which allows fast alterations or exchanges of flower arrangements and the like depending on the wishes.

SUMMARY OF THE INVENTION

This is attained by means of the system according to the present invention, which is characterized in that the table is constructed with mutually connected profiles, provided with bearing supports for soil-carrying plates or boxes, mounted in the table, which bearing supports include elements, which form channels, and in that the soil-carrying boxes or plates are provided with drainage holes, designed to be placed above said channels.

An additional object of the invention is to suggest a table, which can be built with modules, designed to be placed against a wall or in a corner or around a corner. Said modules suitably are mainly piece of pie-shaped sectors. Thus, a preferred embodiment of the table is characterized in that the table is subdivided into sectors by means of partitions, which form a first bearing support, and which partitions extend like a fan from a table corner or from the center of a long side or like spokes from the center of the table. Further, borer elements, which form second bearing supports, connect the outer ends of the partitions in order to make them jointly form the border of the table. Each sector suitably has a central angle of 45°, the table preferably comprising two such sectors in order to constitute a table in a corner, or four sectors in order to constitute a table in a corner, or four sectors to constitute a table which can be attached to a wall, or six sectors to constitute a table which extends around a corner or eight sectors to constitute a table having an outer regular octangonal shape.

In case the external shape of the table is a regular polygon, possibly rounded to form a circle, the table preferably is rotatably mounted on a central support with a hub rotatably mounted on the support. Said first bearing supports are elements on partitions comprising spoke profiles, which extend radially outwards from the hub in such a way that they subdivide the table into said sectors, said second bearing supports comprising elements on border profiles which connect the outer ends of the spoke profiles in order to jointly constitute the border of the table on all sides.

The above-mentioned channels primarily comprise said first bearing supports and at least one drainage opening or passage is disposed in or in connection with each such channel adjacent the center of the table, or adjacent the staring point for said fan-shaped outwardly directed partitions, respectively. Each such channel has a sufficient volume to be able to drain off surplus water from said drainage holes in the boxes or plates towards said drainage opening or passage.

Said second bearing supports, which are elements on the border of the table, preferably also constitute channels, which are able to collect surplus water from said drainage holes in said plates or boxes. These channels in said second outer bearing supports communicating with those channels, which constitute the first bearing supports, in such a way that water which has been collected adjacent the border of the table also will be drained off towards the center of the table or a corresponding point via the channels in the radial or fan-shaped bearing supports.

From what has been stated above one can draw the conclusion that the sectors suitably are triangle-shaped and that the central angle of the sector preferably is 45°. In each triangular sector one or several plant boxes can be placed, which preferably are complimentary to the sector triangle. By giving the plant boxes such a shape that four triangular plant boxes can be disposed in each sector, and by providing each plant box with a bottom hole in each corner, each such hole can be placed above a channel in any of said first and second bearing supports.

The table suitably is open below the plant boxes in such a way, that air can pass through the table in passages between the plant boxes. This is particularly advantageous in case the table is covered with a light-penetrable superstructure in order to obtain a mini-greenhouse. Since the bottom of the greenhouse obtained in this way is provided with air passages, a satisfactory change of air can be achieved without loosing the desirable greenhouse-effect.

Provided it is desirable, in said plant boxes several small plant containers, e.g, four small containers in each large container, can be placed. Thus, in case the table comprises eight sections, each containing 32 plant boxes, a total number of 128 small boxes can be housed, with four small boxes being placed in each one of the large plant boxes.

Thus, in its preferred embodiment the system according to the invention includes a table, which is subdivided into sectors by means of spoke profiles, designed with bearing supports as well as a border on all sides, which also is designed with bearing supports for plant boxes. The bearing supports also are used as drainage channels, which end against a central pole or the like, where the water either can flow along the central pole (for use outdoors) or be collected (for use indoors). Since the system has loose plant boxes and drainage channels, this means that no floor, i.e. means of which the boxes can be supported, is needed, which results in an excellent ventilation effect, i.e. fresh air all the time penetrating from below.

According to the preferred embodiment the boxes are supported by the bearing supports, designed as drainage channels, having three corners and two complete sides The system is built in such a way, that all the boxes lock each other and that the boxes cannot fall out from their bearing supports even if one box is removed from the system, despite the fact that there is no covering bottom between the bearing supports.

In case the plant table, in accordance with a preferred embodiment, is provided with a central axis, the plant table can be rotatably mounted about its axis. This is important to old people and/or handicapped persons, who can push their wheel chair into a position below the table and reach all of the plant boxes, when they start revolving the table.

Additional characterizing features and aspects as well as advantages of the present invention will be set forth in the following patent claims and the following description of a few preferred embodiments.

BRIEF DESCRIPTION OF THE DRAWINGS

In the following description reference will be made to the accompanying drawings, in which.

DESCRIPTION OF PREFERRED EMBODIMENTS

Figure 1:
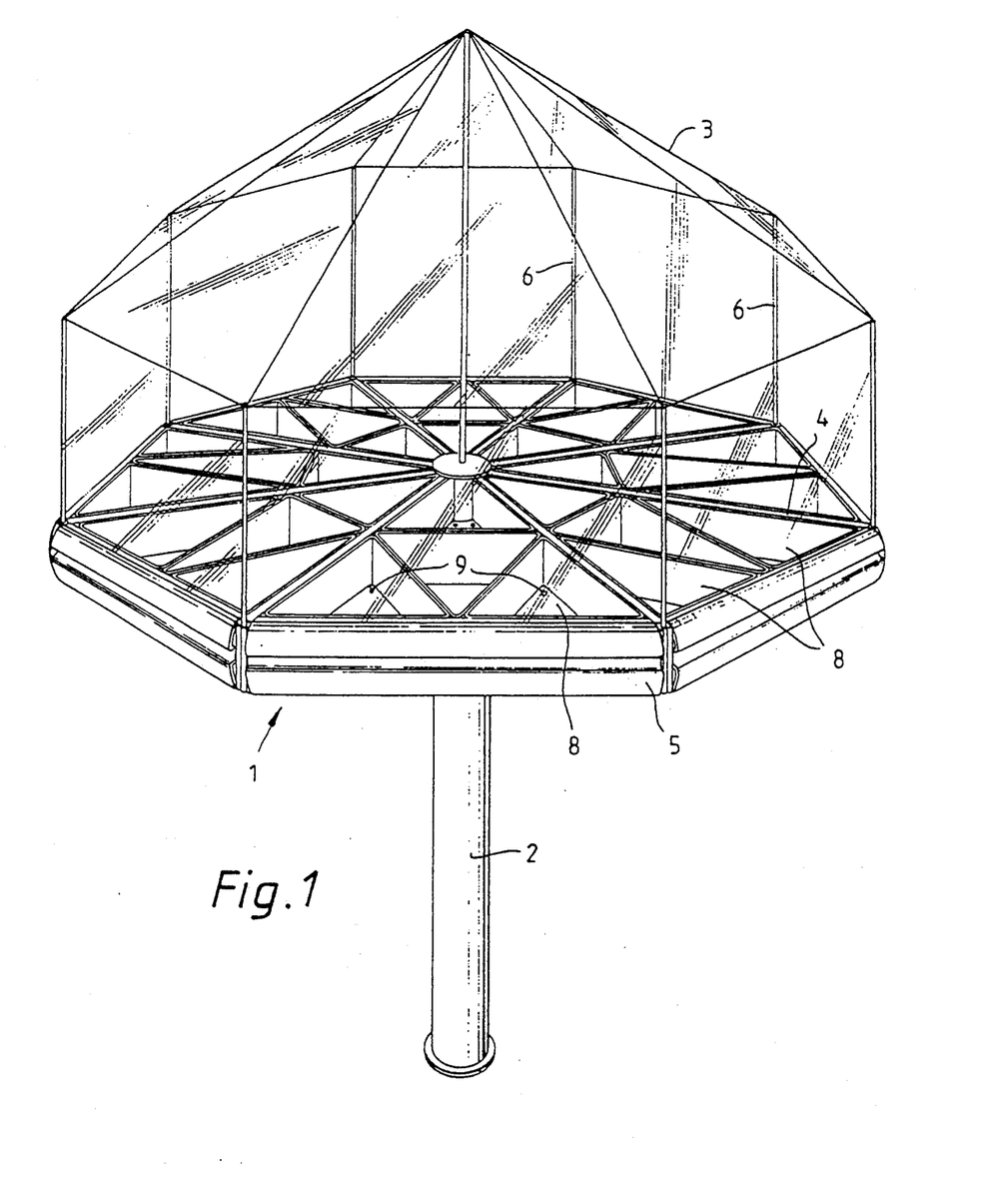
FIG. 1 is a perspective view of a preferred embodiment of a self-supporting table having a central support and a roof made of a transparent material, illustrating how the plant table is to be used.

FIG. 1 is a perspective view of the plant growing system according to the present invention, designed as a table 1, mounted on a central support 2 and having a roof 3 of a transparent plastic cloth. The shown embodiment of the table is polygonal and particularly has a regular octogonal shape.

Figure 3:
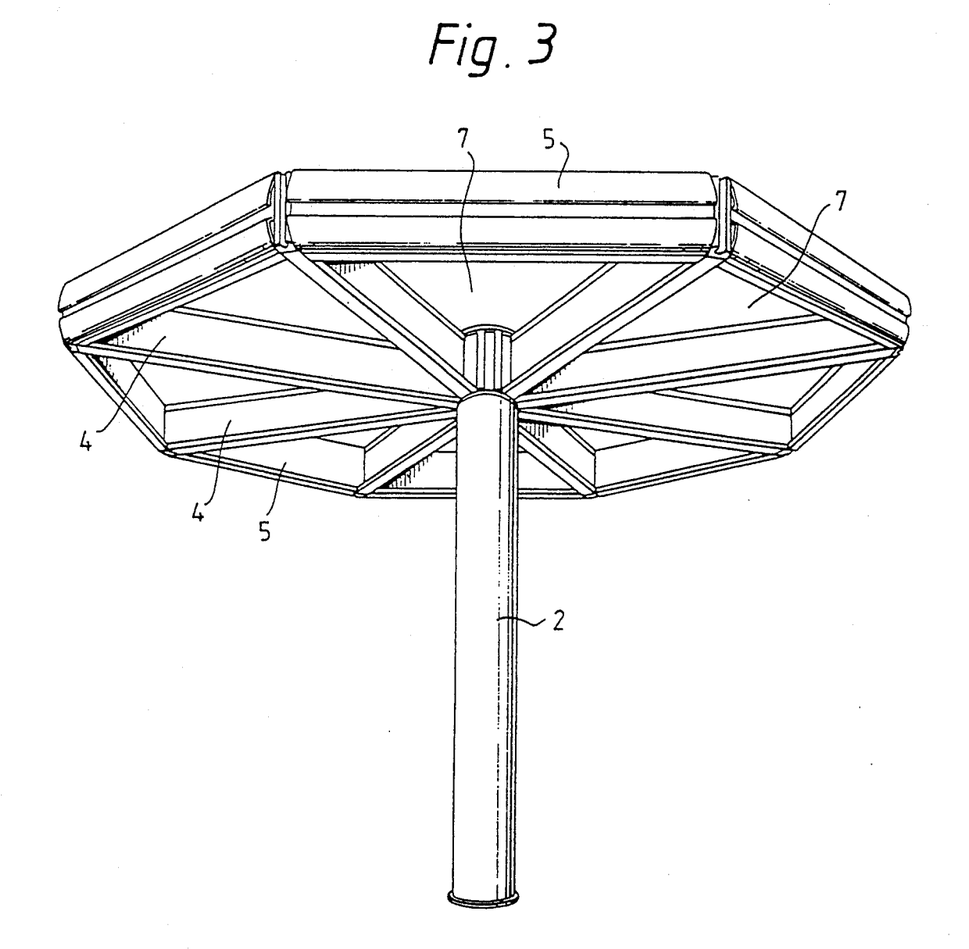
FIG. 3 shows the plant table according to FIG. 2 in a perspective view from below, the plant boxes being removed.

Table 1 is by means of radial partitions 4, see FIG. 3—called spoke profiles supra and infra—and a border 5 on all sides subdivided into sectors 7 substantially having a triangular shape. The triangles of this embodiment are equally sided and their central angle is 45°.

Roof 3 is stretched on top of lateral poles 6, which are placed in each corner of the polygon, i.e. on top of eight lateral poles 6 according to the shown embodiment Roof 3 then resembles a circus tent. The roof, which is made of transparent plastic cloth, is subdivided into the same number of sections as the number of sectors 7 of table 1, and each section covers an adjacent section by a few centimeters. Each roof section can separately be opened up or all of them simultaneously and be fastened in a single manipulation by means of a suitable attachment element, e.g. hooks and crooks, Velcron tape, snap fasteners, magnetic couplings or the like, i.e. gadgets which do not have to be described in detail in this text. Suitably said attachment elements are designed in such a manner that, e.g., all plastic sections can be attached above one single sector 7 of the table and a maximum accessibility to all parts of the plant table be attained.

Figure 2:
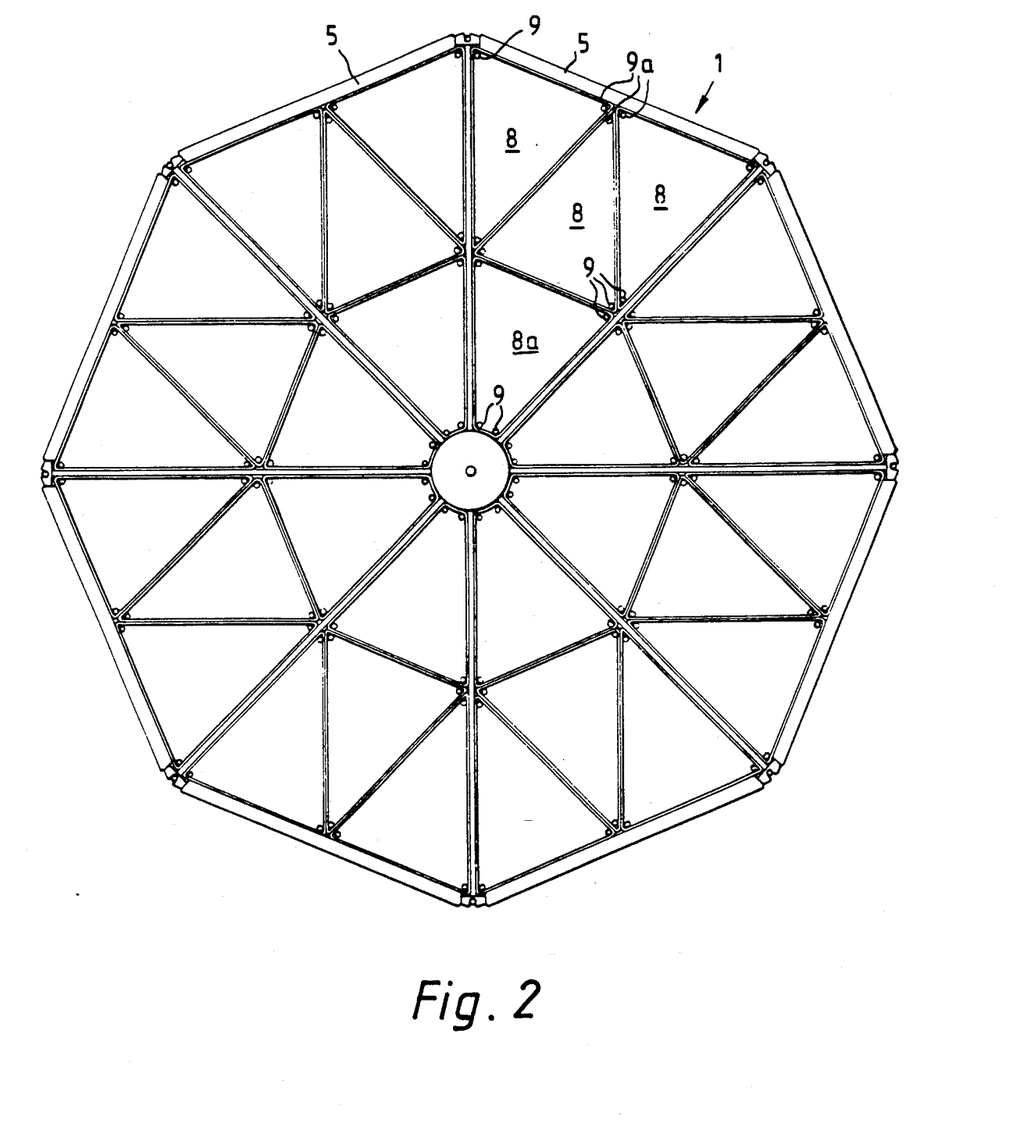
FIG. 2 shows the same plant table from above without any roof and with empty plant boxes.

Each sector 7 forms a frame for, according to the shown embodiment, four triangular plant boxes 8,8a. Plant boxes 8,8a have such a size that four of them will fill the frame in a sector completely. Plant containers 8a, which are disposed adjacent the center of table 1, preferably have a blunt point. The rest of the containers 8,8a have the same size, and the three outer plant containers 8 are completely identical. In the corner of containers 8 and in their bottom is provided a drainage hole 9. Containers 8a are also provided with a drainage hole 9 in two of their corners and preferably with two drainage holes 9 in that corner which faces the center of the table, see FIG. 2.

Figure 4:
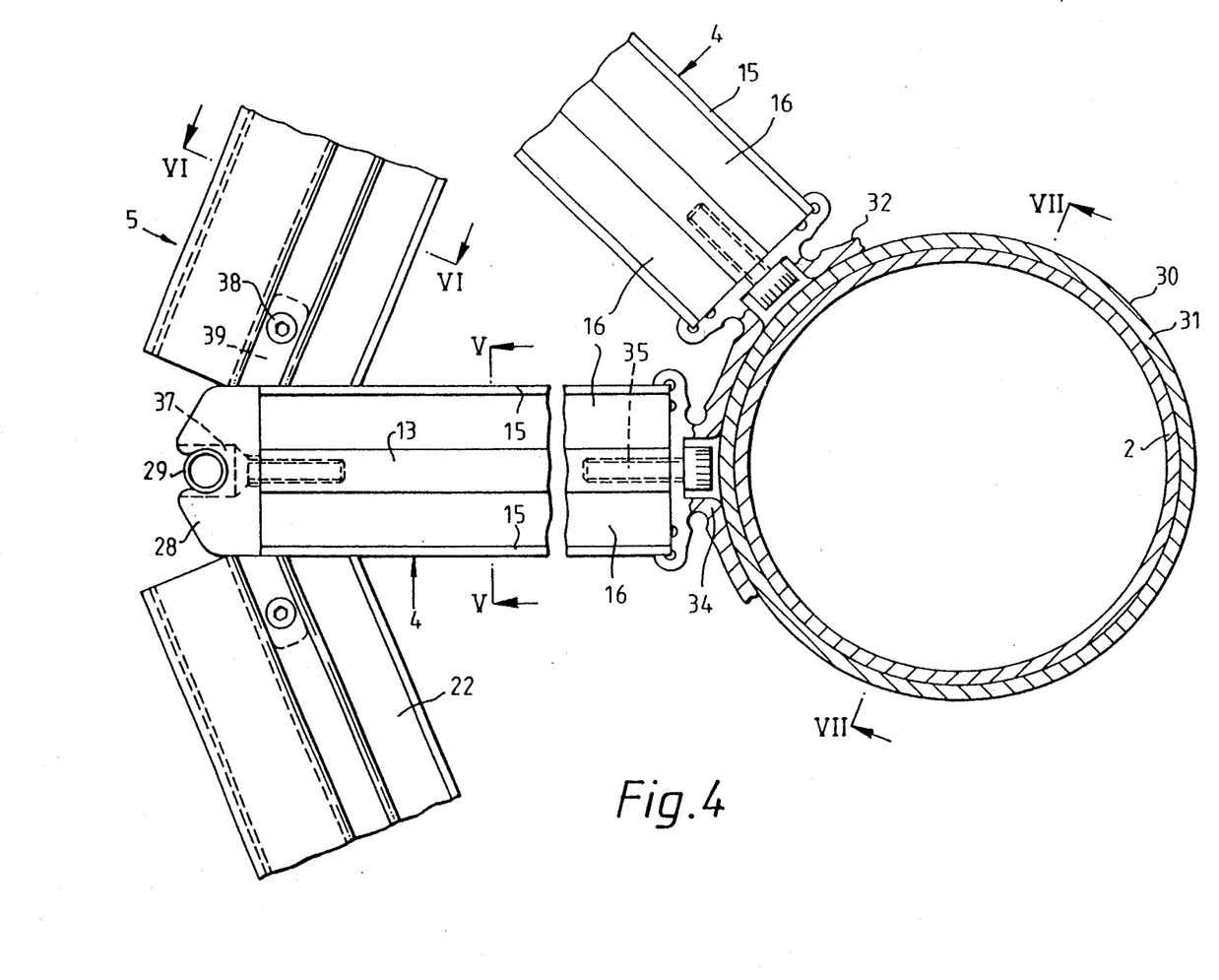
FIG. 4 is a partial view from above of the attachment between spoke profiles and two border profiles as well as the attachment of spoke, profiles in a hub, rotatably disposed about the central support of the table.
Figure 5:
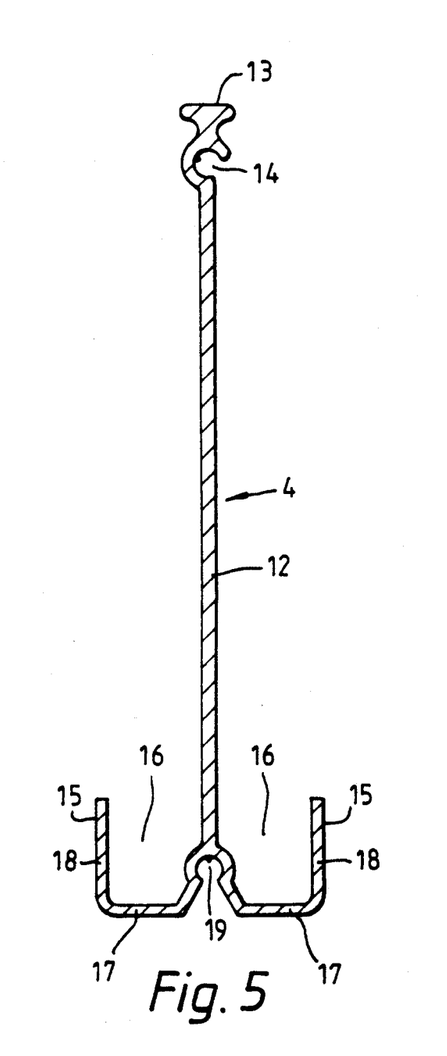
FIG. 5 shows a cross-section of a spoke profile along line V—V in FIG. 4.

FIGS. 4 and 5 show how spoke profiles/partitions 4 are designed. Spoke profiles 4 are, made of an aluminum profile, which is stamped as a single and comprises a vertical web 12 and at the top a double flange 13 having an planar top surface as well as a screw holder 14 between said flange 13 and web 12. Also, in its lower portion spoke profile 4 on each one of its sides has a bearing support, generally designated 15. Each bearing support 15 also forms a channel 16, which is defined by an planar horizontal bottom 17, a vertical lateral wall 18 as well as the lower portion of web 12. A lower screw holder is designated 19.

Figure 6:
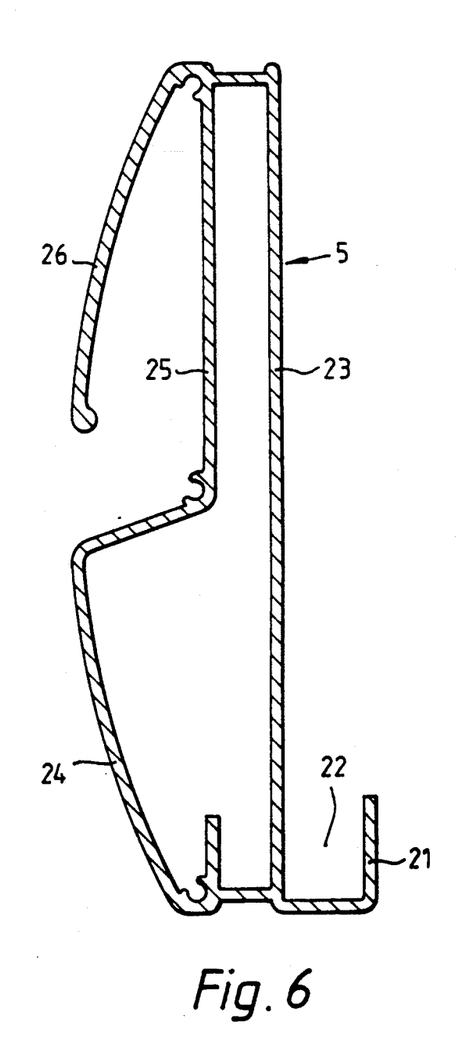
FIG. 6 shows a cross-section of a border profile along line VI—VI in FIG. 4.

In FIG. 6 a cross-section is shown of an embodiment of border profiles 5, which like spoke profiles 4 in their lower portion have a bearing support 21, which also, forms a channel 22, which faces the center of the table. The bearing support 21 comprises an upright flange, which constitutes one of the walls of channel 22. Border profile 5, which also comprises an aluminum profile, has been extruded as a single piece and has a vertical planar web 23, which faces the center of the table, as well as outer portions, which include a lower bent portion 24, an upper planar portion 25 and outside the latter a bent upper portion 26, which forms a gripping handle to be used when table 1 is to be revolved. A connecting element, designed for an assembly of spoke profiles 4 and border profiles 5, is designated 28, see FIG. 4. Each connecting element 28 includes a vertical hole 29 for the mounting of lateral poles 6 for roof 3.

Figure 7:
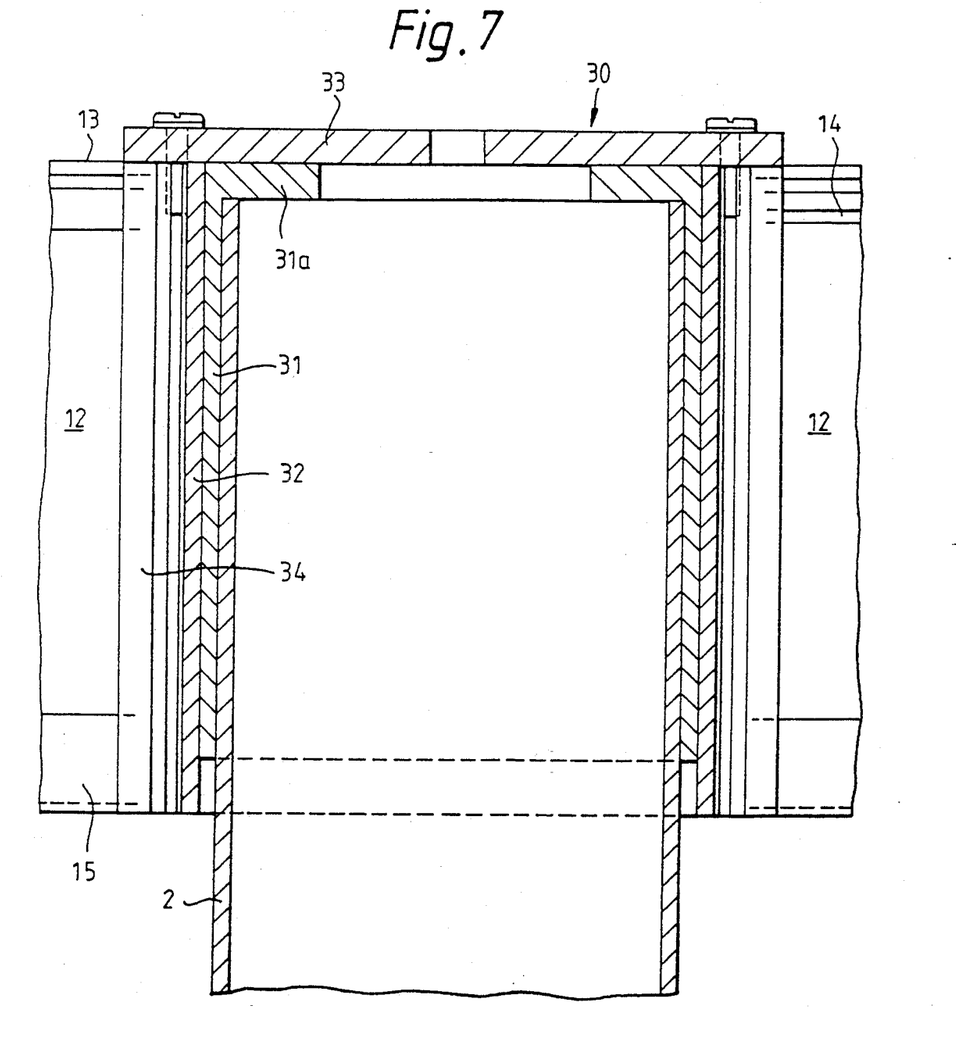
FIG. 7 shows a cross-section of the hub of the plant table along line VII—VII in FIG. 4.

A hub is generally designated 30, see FIGS. 4 and 7. In the shown embodiment hub 30 comprises an inner sliding sleeve 31 having a folded upper edge 31a and on which an attachment sleeve 32 has been mounted, which is retained on sliding sleeve 31 by means of a cover 33. Attachment elements 34 are mounted on attachment sleeve 32 and designed for the mounting of the inner ends of spoke profiles 4 by means of screws 35, see FIG. 4, extend into screw holders 14,19, see FIG. 5.

Border profiles 5 are, by means of said connecting elements 28, connected to spoke profiles 4 at the outer ends of the latter. The mounting can also in this case be done by means of a screw fitting, using screws 37, which extend into screw holders 14,19, and screws 38, which connect border profiles 5 with legs 39 of connecting elements 28 respectively.

The system works as follows. Plant containers 8,8a having bottom holes 9,9a are positioned on bearing supports 15,21 of spoke profiles 4 and border profiles 5, holes 9,9a being arranged in such a way, that they are placed above channels 16 or 22. Water, which is not absorbed by the soil but flows through holes 9,9a, is collected in channels 16,22, channels 22 communicating with channels 16. Also, channels 16 and 22 have such a large volume that they can accumulate a sufficient amount of water, that the water, without any overflowing, is guided along channels 16 towards the center of table 1. According to one embodiment the water is allowed to drop or flow towards the central support 2 and pass along its external side downwards into the ground or the like support. In an alternative embodiment a collecting vessel can be mounted on central support 2, e.g. in case the system is to be used indoors.

Figure 8:
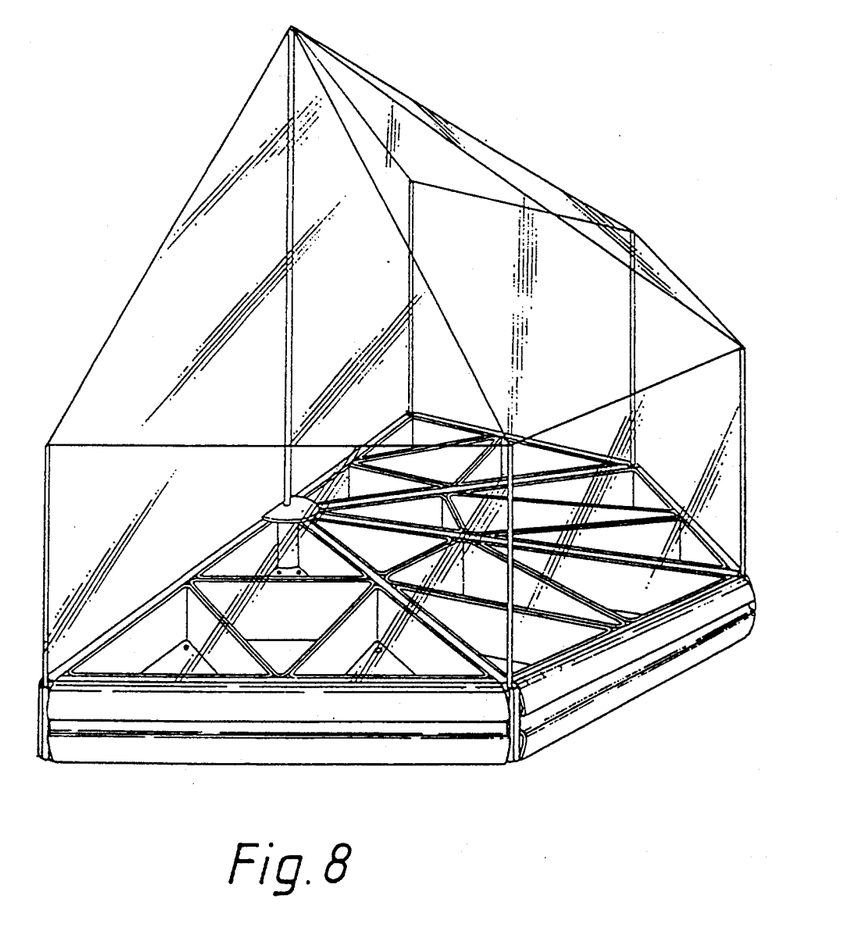
FIG. 8 is a perspective view of a second embodiment of a plant table according to the invention, designed to be mounted on a wall.

FIG. 8 shows an alternative embodiment of the invention. The table in this case comprises four sectors of the same type as the ones in the embodiment described supra, the table being mounted against e.g. a wall. The central support is in this case replaced by half a cylinder, provided with stationary mounting elements of the same type as shown in FIG. 4.

Figure 9:
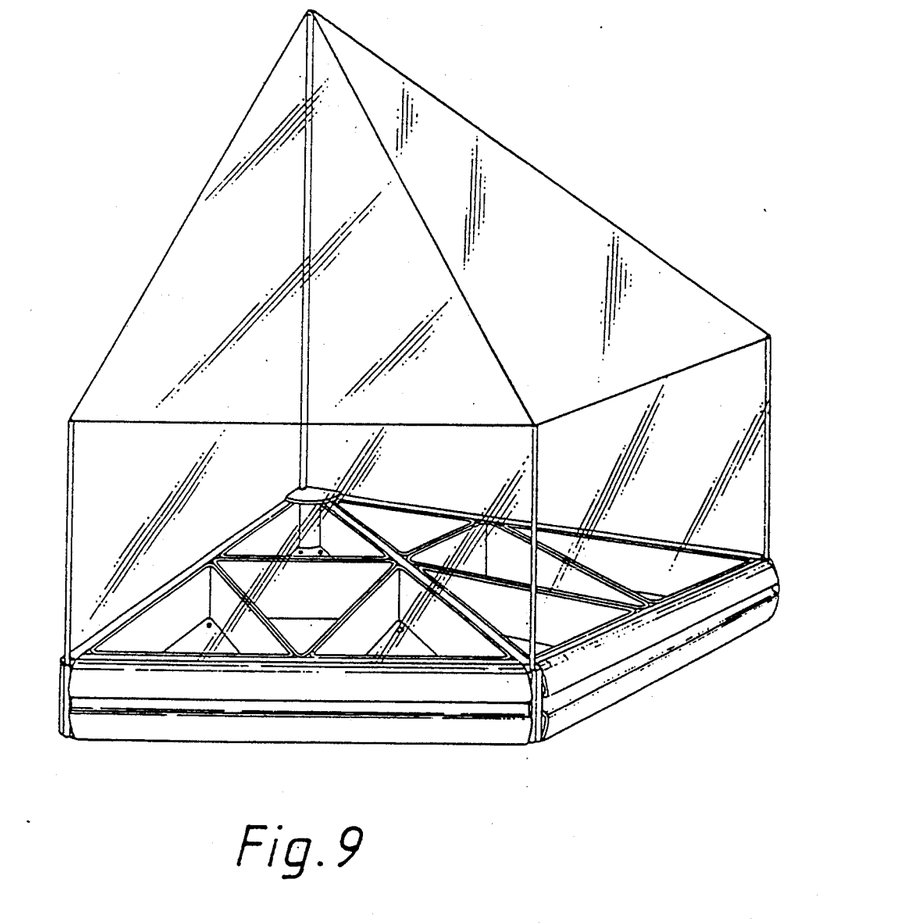
FIG. 9 snows a third embodiment of a plant table according to the invention, designed to be mounted in a corner.

FIG. 9 shows an additional embodiment, which comprises only two sectors 7, which are designed for a mounting of the plant table in a corner.

The present invention can of course be modified within the scope defined by the following patent claims, and the description above is merely one example of a preferred embodiment. Thus, the roof can, e.g., be designed in a plurality of ways. Instead of lateral poles, which support the plastic roof, e.g., a round or polygonal ring can be used, which by means of a cross or the like is attached to the center pole, which in turn is screwed into the cover. In this way a completely open space below the roof, available for work, can be obtained. Roofs of plexiglass in sections can also be used.

I claim:

1. Table for growing and cultivation of plants comprising a plurality of first and second profiles connected to each other and forming a plurality of bearing supports for soil-carrying containers, said first profiles extending from a central point on the table and forming partitions which subdivide the table into sectors, said second profiles forming border elements and being connected to outer ends of said partitions to jointly define a border of the table, said first and second profiles having channels which form at least a part of a drainage system for surplus water, said soil-carrying containers having at least one drainage hole disposed above said channels, and at least one drainage passage communicating with each said channel and being disposed adjacent the central point of the table starting point for said fan-shaped outwardly directed partitions, with each said channel having a sufficient volume to lead surplus water from said drainage holes towards said drainage passage.

2. Table according to claim 1, wherein the table is an assembly of separate modules of pie-shaped sectors.

3. Table according to claim 1, wherein the sectors are substantially triangularly-shaped, the point of the triangle being directed inwards towards the central point of the table and at least part of the containers are triangular in shape with said drainage holes in the corners thereof.

4. Table according to claim 3, wherein said containers have such a size such that four containers fill each sector.

5. Table according to claim 1, wherein the shape of said table is a regular polygon, the table is rotatably mounted on a central support having a hub rotatably mounted on said support, and said partitions are attached to said hub and extending radially outwards from the hub.

6. Table according to claim 1, wherein the table has a longer side adapted to be mounted against a wall, and said partitions extend outwardly and fan-like from said central point located on said longer side.

7. Table according to claim 1, wherein the said table is adapted to be mounted in a corner, and said partitions extend fan-like outwardly from the locus of said corner.

8. Table according claim 1, wherein space within said sectors is open and a change of air is passable through said space and between the soil-carrying containers positioned on said bearing supports.

* * * * *